May 1, 1928.
F. J. SESCILA
RADIUS ROD
1,668,426
Original Filed May 18, 1923
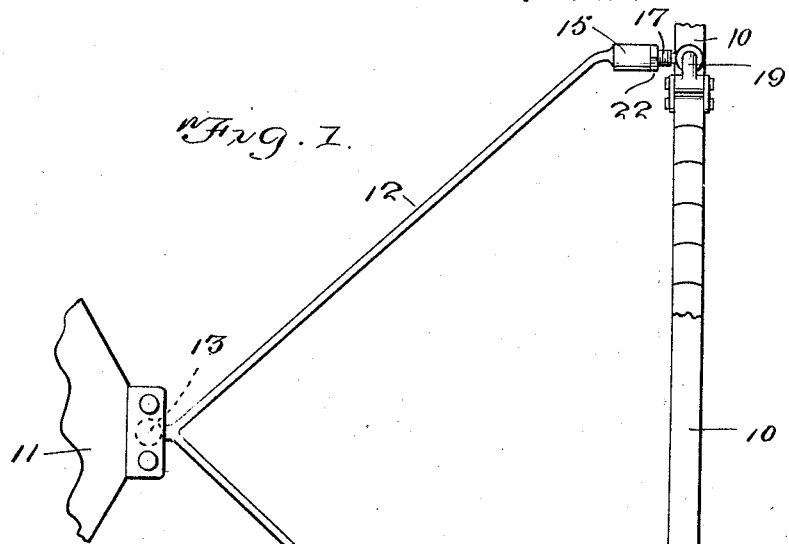
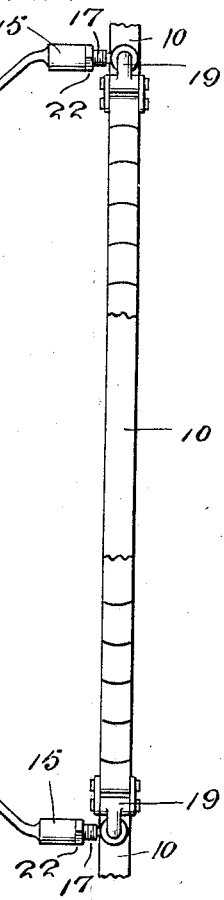
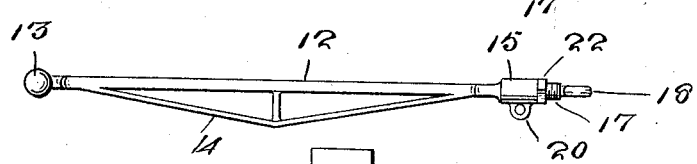
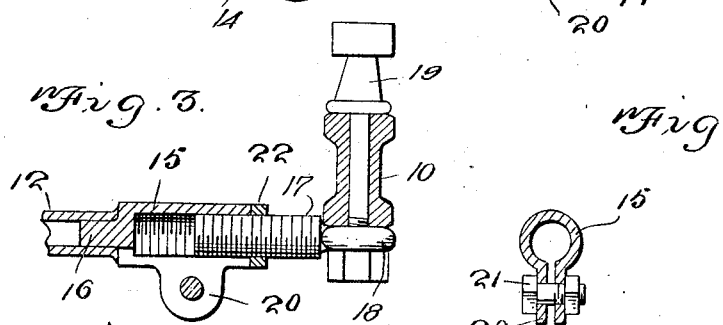
INVENTOR
F. J. Sescila
BY Victor J. Evans
ATTORNEY
WITNESS:

Patented May 1, 1928.

1,668,426

UNITED STATES PATENT OFFICE.

FRANK J. SESCILA, OF LORAIN, OHIO.

RADIUS ROD.

Application filed May 18, 1923, Serial No. 639,887. Renewed March 21, 1928.

This invention relates to improvements in radius rods for motor vehicles and has for an object the provision of a reinforced rod, which is light, strong and durable in construction.

Another object of the invention is the provision of a radius rod having novel means of adjusting its length to take up wear, which means in addition provides for the substitution of a new connecting means between the rod and front axle in case of necessity, so that an entirely new rod will not be required.

With the above and other objects in view, the invention further includes the following novel features and details of construction, to be hereinafter more fully described, illustrated in the accompanying drawings and pointed out in the appended claim.

In the drawings:—

Figure 1 is a plan view showing a fragmentary portion of the running gear of a vehicle with the invention applied.

Figure 2 is a side elevation of the same with parts shown in section.

Figure 3 is an enlarged longitudinal sectional view through the axle connecting means and showing the manner of adjusting the length of a rod.

Figure 4 is a transverse sectional view of the same.

Referring in detail to the drawings, wherein like characters of reference denote corresponding parts, the reference character 10 indicates the front axle of an automobile, while 11 indicates a fixed part of said vehicle.

The improved radius rod which includes divergent arms 12, connected at one of their ends, has one end swiveled to the fixed part 11 as shown at 13, while the opposite ends of the arms 12 are connected to the front axle 10 in a manner to be hereinafter described. The arms 12 are made of relatively light material and are preferably tubular and in order to insure proper strength to resist the strain to which the arms are subjected, each arm has extending along its lower portion a truss 14 so as to resist buckling or bending.

After the ordinary radius rod has been in use for sometime, they become worn at their points of connection, so that they do not afford the proper reinforcing means for the front axle 10 and it is necessary to substitute a new rod. In the rod of the present invention, means is provided for taking up this wear, which means including an internally threaded sleeve 15 which extends from the bifurcated ends of the rod. These sleeves may be connected to the rod in any desired manner, for example by providing the sleeves with a reduced extension 16 which enters and may be welded within the ends of the rod. The sleeve 15 is split longitudinally and is adapted to receive the threaded end of an extension 17, whose outer end is provided with an apertured lug 18 for connection with a spring perch 19 of the automobile, as clearly illustrated in Figure 3 of the drawing. The split sleeve is provided with apertured ears 20 upon opposite sides of the split and these ears receive a clamping bolt 21, by means of which the sleeve may be tightly clamped upon the threaded extension 17 after the latter has been properly adjusted. A jam nut 22 is mounted upon the threaded portion of the extension 17 and is adapted to engage the end of the sleeve 15 to further aid in holding the parts in adjusted position.

By means of the construction just described, the extension 17 may be adjusted to hold the axle 10 in proper position and when the parts have become worn, further adjustment may be effected through the connection just described. If necessary, the extension 17 may be removed and a new section substituted and the cost of an entirely new radius rod will thus be saved.

The invention is susceptible of various changes in its form, proportions and minor details of construction and the right is herein reserved to make such changes as properly fall within the scope of the appended claim.

Having described the invention what is claimed is:—

A radius rod for use upon motor vehicles having tubular end portions, sleeves provided with reduced extensions carried within said tubular ends, said sleeves being split and provided with registering apertured ears upon the opposed sides thereof, extensions threaded within the sleeves and terminating to provide apertured lugs receiving the vehicle spring perches, jam nuts carried by the extensions abutting the sleeves, and fastening elements carried by the apertured ears of the sleeves to afford locking adjustment for the extensions.

In testimony whereof I affix my signature.

FRANK J. SESCILA.